Patented June 12, 1945

2,378,053

UNITED STATES PATENT OFFICE 2,378,053

PRODUCTION OF IRON CARBONYL

Albert Edward Wallis and Stanley Charles Townshend, Swansea, South Wales, assignors to The International Nickel Company, Inc., New York, N. Y., a corporation of Delaware No Drawing. Application February 15, 1943, Serial No. 475,973. In Great Britain January 22, 1942

10 Claims. (Cl. 23—203)

The present invention relates to the production of iron carbonyl and more particularly to the production of iron carbonyl at temperatures and pressures heretofore considered impractical for industrial operation.

The usual way for producing a metallic carbonyl is to pass carbon monoxide, or gases containing a substantial portion of carbon monoxide, over the metal of which the carbonyl is to be formed. Usually the metal is obtained by gaseous reduction of its oxide. However, prior art processes have also been shown applicable to the production of carbonyls from precipitated sulfides of iron and nickel as well as mattes containing nickel and/or iron and copper obtained in the reduction of nickel ores. However, as generally carried out, only nickel carbonyl is produced when mixtures of nickel and iron are treated with carbon monoxide, the iron being for the most part left as a residue in the reaction vessel. The temperatures and pressures at which the reaction between carbon monoxide or carbon monoxide-containing gases and the metal or metal compound is carried out depend upon the particular metal. The carbonyl most largely produced commercially in this manner is nickel carbonyl, the reaction taking place at atmospheric pressure and at a comparatively low temperature, for example 40° C. to 50° C., although it is common practice to use higher temperatures and higher pressures in the production of nickel carbonyl. The nickel carbonyl is obtained by the action of carbon monoxide gases on calcined and reduced nickel or copper-nickel mattes, which invariably contain some cobalt, and it is widely known that the rate of carbonyl formation from these mattes progressively decreases with increasing cobalt content. It is believed at this time that the reduction in the speed of the reaction between nickel and carbon monoxide in the presence of cobalt in intimate admixture with the nickel is the result of the fact that cobalt and nickel are so similar atomically that when the nickel is removed as carbonyl from the crystal lattice of the reduced matte, it is replaced by cobalt. This replacement of the nickel atoms in the lattice by cobalt atoms slows down the reaction because the cobalt surface so produced is not attacked by the carbon monoxide at atmospheric pressure.

This effect of cobalt can be largely overcome and the nickel carbonyl reaction can be maintained by ensuring that sulfur is present in active form in the reaction chamber in the manner described in U. S. Patent No. 1,909,762. That is to say, by introducing metallic sulfates such as nickel sulfate into the calcined nickel matte before its reduction, the presence of sulfur in the active form can be ensured through the partial decomposition of the sulfate in the calcined matte during the reduction process with the evolution of hydrogen sulfide. The hydrogen sulfide (or carbonyl sulfide formed from it in the reaction chamber) preferentially combines with the cobalt to form cobalt sulfide which is unable to enter the crystal lattice.

However, it is recognized by those skilled in the art that the reaction between carbon monoxide or gases containing carbon monoxide and reduced iron involves factors entirely different to those affecting the kinetics of the reaction between reduced nickel and carbon monoxide or carbon monoxide-containing gases. This is clearly stated by the patentees Mittasch, Schlecht and Gaus in U. S. Patent No. 1,812,399, at page 1, lines 5 to 11 in the following words:

"When trying to produce iron carbonyl by the action of carbon monoxide on iron by methods by which nickel carbonyl is produced on a commercial scale, either no iron carbonyl at all is obtained or the process proceeds in such a sluggish manner that the process can not be carried out on a commercial scale."

It has been found that there is a possible explanation for this difference in the reaction between iron and carbon monoxide and nickel and carbon monoxide which may be explained on the basis of the peculiar affinity of iron for carbon. Iron carbonyl is usually produced by the reaction of carbon monoxide with iron generally obtained by the reduction of iron ore, but at temperatures and dependent pressures much higher than are required for the production of nickel carbonyl from reduced nickel. In contrast to the operative temperature of 40 to 50° C. for the production of nickel carbonyl, a much higher temperature is required, usually of the order of 175° C. for the production of iron carbonyl. In addition, a high pressure usually from 100 to 200 atmospheres or even as high as 2000 atmospheres is employed both to make the reaction proceed sufficiently rapidly and to drive the carbon monoxide into the lumps of reduced ore. Naturally, the use of such high pressures is expensive and troublesome and leads to the decomposition of the carbon monoxide. On the other hand, when an attempt is made to operate at lower temperatures and pressures, for example, temperatures of about 90 to 100° C. and pressures of the order of 10 to 20 atmospheres, it has been found that the rate of formation of iron carbonyl decreases so rapidly that the process becomes uneconomical.

It has been discovered that this decrease in the rapidity with which the reaction between iron and carbon monoxide proceeds is a result of a decrease in activity caused by the formation of carbides of iron as a result of secondary reactions between the reduced iron and the carbon monoxide.

Many attempts have been made to overcome this difficulty which arises in the production of iron carbonyl. Thus, in U. S. Patent No. 1,812,399 the patentees disclose that if reduced fine-grained roasted pyrites are made into a paste with paraffin oil and treated in intimate contact with a stream of carbon monoxide for about 3 hours at 200° C. and 200 atmospheres pressure, 80% of the iron is volatilized as carbonyl.

U. S. Patent No. 1,836,474 discloses a process for producing iron carbonyl which involves making a paste of reduced powdered roasted pyrites with iron carbonyl. The paste is pressed into a vessel and heated to 200° C. and carbon monoxide passed into the vessel containing the paste with such a velocity at 200 atmospheres of pressure that the partial pressure of the carbonyl in the effluent gas does not reach the vapor pressure of iron carbonyl at 200° C. (about 8 atmospheres).

Again in U. S. Patent No. 1,858,220 a process is disclosed in which roasted pyrites are drenched with a 10% solution of magnesium sulfate and reduced by means of hydrogen at 800° C. The reduced pyrites are then treated at 200° C., with carbon monoxide under a pressure of 200 atmospheres whereby it is possible according to the patentees to obtain a conversion of about 94.1% of the iron in the pyrites into iron carbonyl in about 6 hours. The patentees point out that without such previous treatment of the pyrites with the solution of magnesium sulfate and the other conditions being equal, less than half of the iron is converted into carbonyl.

In U. S. Patent No. 2,086,881 the patentees Schlecht and Naumann point out:

"In other cases, sulfur or sulfur compounds have been found to act highly detrimentally on the formation of iron and nickel carbonyl. Thus, when a nickel matte is subjected to an incomplete roasting treatment so that a substantial portion of the sulfur initially present is left in the material, the formation of nickel carbonyl proceeds usually very slowly, if at all, even if after the incomplete roasting the material has been subjected to a reduction treatment under moderate conditions so as to produce a highly porous metal.

"The aforesaid prior processes therefore are more or less tedious in practice when sulfidic initial materials are to be converted into metal carbonyls, and furthermore, they involve very often other disadvantages such as the consumption of large amounts of carbon monoxide for reducing the sulfides to the metallic state whereby carbon oxy-sulfide is formed. It is probably for these reasons that there is still a great demand for a simple and economical process for making metal carbonyls from such materials as mattes containing nickel, or iron, or both."

These patentees also point out that when starting from a matte containing iron and sulfur only, carbonyl formation takes place at pressures up to about 200 atmospheres until the composition of the remaining mass corresponds about to the formula $FeS_2$ whereby no carbon oxy-sulfide is formed and it is only at substantially higher pressures of, for example, 1000 or 2000 atmospheres that also the remaining iron sulfide reacts with carbon monoxide whereby iron carbonyl and carbon oxysulfide are formed simultaneously. These patentees disclose that if iron carbonyl is to be made from impure scrap iron, the scrap iron is melted in a cupola furnace with so much pyrites that the resulting matte contains about 10% sulfur. This matte is then comminuted until the particles have an average size of 5 millimeters and is then treated with streaming carbon monoxide under a pressure of 200 atmospheres at about 200° to 275° C. In the course of 10 hours about 75% of the initial material is converted into iron carbonyl. On the other hand, iron carbonyl can be made from scrap iron according to these patentees by smelting the scrap iron with so much copper and sulfur that the amount of these two substances is about 30% by weight of the resulting matte, the proportion of copper to sulfur corresponding about to the formula $Cu_2S$. The comminuted matte is acted upon with streaming carbon monoxide under a pressure of about 200 atmospheres and at a temperature of from 140° to 250° C.

In the production of nickel carbonyl it has been found that the rate of formation of nickel carbonyl is increased by the presence in the reaction chamber of a compound containing sulfur, selenium or tellurium in active form (U. S. Patent No. 1,909,762). The expression "active form" as used in the aforementioned patent includes compounds of sulfur, selenium and tellurium such as for example nickel sulfide, nickel selenide or nickel telluride. (Page 1, lines 31 to 36.) However, the temperature of the reaction and the pressures employed even in the presence of active sulfur are the same as usually employed for the production of nickel carbonyl.

From the foregoing brief references to the prior art it will be recognized that the art has appreciated that in the production of nickel carbonyl the reaction can be accelerated by carrying out the reaction in the presence of active sulfur. It is also manifest that none of the processes of the prior art which specifically is applicable to the production of iron carbonyl has provided a means whereby lower temperatures and lower pressures can be employed for the production of iron carbonyl. Thus, although many attempts have been made to effect the production of iron carbonyl under more favorable conditions from an industrial standpoint, none of these prior art processes has been wholly satisfactory when carried out on an industrial scale.

It has now been discovered that iron carbonyl can be produced from reduced iron at temperatures and pressures heretofore considered impractical for industrial operation.

It is an object of the present invention to provide a method whereby iron carbonyl can be produced from reduced iron with 100% conversion in not more than about 24 hours.

It is another object of the present invention to provide a method whereby iron carbonyl can be produced at temperatures not greater than about 200° C.

It is a further object of the present invention to provide a method whereby iron carbonyl can be produced from reduced iron at pressures not greater than about 200 atmospheres with about 100% conversion.

The present invention also contemplates a method for producing iron carbonyl at temperatures of the order of 90 to 100° C. at pressures of the order of about 10 to about 20 atmospheres with about 100% conversion in not more than 24 hours treatment.

Other objects and advantages will become apparent from the following description.

In conventional prior art processes iron-containing material is treated in such a manner as to provide highly active metallic iron. Usually the reduced ferrous material such as reduced iron ore is treated for the production of iron carbonyl in the form of pieces of reduced iron ore about ¼ of an inch to about 1 inch in diameter. When such reduced iron ore is treated in the customary manner with carbon monoxide or carbon monoxide-containing gases the velocity of the reaction is very low when carried out at temperatures of about 90 to about 100° C. and at say 20 atmospheres pressure. In fact, under such conditions of temperature and pressure only about 30% of the iron is converted to iron carbonyl in about 20 hours. Although as has been recognized, sulfur in the form of sulfides such as nickel sulfide is effective to increase the velocity of the reaction involved in the production of nickel carbonyl from reduced nickel, nevertheless the addition of solid sulfides to reduced iron such as described hereinbefore is not effective. Furthermore, gaseous sulfides have been found to be ineffective also in view of the fact that there is an excessive local action near the inlet port for the gaseous sulfides and relatively ineffective action at points remote from the gas inlet. Thus, it is manifest that sulfides are not effective in increasing the velocity of the reaction between iron and carbon monoxide to produce iron carbonyl. However, the reaction between reduced iron and carbon monoxide can be accelerated to a remarkable extent by treating the iron-containing material with a solution of sulfates prior to reduction of the iron to the metallic state. All sulfates are not effective and it has been found that the soluble sulfates of the heavy metals are the effective catalysts in the reaction between iron and carbon monoxide. Furthermore, the amount of sulfate has been found to be critical, and must be maintained below a certain maximum critical amount.

The precise manner in which the sulfate brings about the remarkable results is not certain but in view of the entirely different cause for the reduction in the rate of production of nickel and iron carbonyl respectively, it is manifest that there is no relation between the mechanisms by which the acceleration is produced. Thus, although most sulfides are the equivalent of sulfates in promoting the formation of nickel carbonyl, no such equivalence exists in the formation of iron carbonyl.

It is found to be essential that the heavy-metal sulfate should be added before reduction of the iron ore to metallic iron and should be uniformly spread over the surface of the iron ore.

The sulfates employed to obtain the novel results set forth herein are any soluble sulfate of a heavy metal, such as nickel sulfate, iron sulfate, cobalt sulfate and copper sulfate, preferably nickel sulfate. The amount of sulfate employed is critical and should not exceed an amount such that the proportion of $SO_3$ in the sulfate to the reduced iron ore is from about 0.2% to about 0.5% by weight. Thus an iron ore of ½ inch size is immersed in a cold saturated aqueous solution of nickel sulfate. The ore is removed from the solution of sulfate and allowed to drain and dry. The amount of absorbed nickel sulfate corresponds to about 0.5% $SO_3$ based on the weight of the iron ore. That is to say, the iron ore absorbed about 2%, by weight of $NiSO_4.7H_2O$. The iron ore with the absorbed nickel sulfate is then subjected to reduction preferably by hydrogen at conventional temperatures such as about 500° C., until the iron ore has been reduced to metallic iron. The metallic iron is then heated with carbon monoxide at temperatures of about 90 to about 100° C. at pressures of 10 to 20 atmospheres. Higher temperatures such as 140° C. and higher pressures such as 200 atmospheres may be employed. From the foregoing it will be apparent to those skilled in the art that reduced iron ore which has been treated with soluble heavy-metal sulfates to the extent that the iron ore has absorbed about 0.2% to about 0.5% $SO_3$ based on the weight of the ore may be treated with carbon monoxide or carbon monoxide-containing gases at pressures from 10 atmospheres to 200 atmospheres and at temperatures from 90° C. to 140° C. It will be readily understood by those skilled in the art that the higher the temperatures employed the greater the pressure under which the reaction between the reduced iron and the carbon monoxide is carried out.

Illustrative of the remarkable results obtained by the new process as a result of the treatment of the ferrous material with soluble heavy-metal sulfate prior to reduction to the metallic state is the following tabulation of comparative treatment of iron ore reduced without the addition of soluble heavy-metal sulfate and then treated with carbon monoxide and iron ore treated with soluble heavy-metal sulfate prior to reduction to the metallic state and then treated with carbon monoxide. In these comparative tests the iron ore was reduced by hydrogen at 500° C. The reduced ore was then heated with carbon monoxide at temperatures of about 90 to about 100° C. and at a pressure of about 20 atmospheres. One batch of iron ore was not treated with heavy-metal sulfate prior to reduction by hydrogen whereas the other lot of iron ore was treated with an aqueous solution of nickel sulfate and absorbed about 2% nickel sulfate equivalent to about 0.5% $SO_3$ based on the weight of the iron ore. In the following table is given the percentage conversion into iron carbonyl at various times of reaction for material treated in accordance with the present invention and untreated iron ore.

| Reaction time (hours) | Percent conversion to iron carbonyl | |
|---|---|---|
| | Untreated | 2% $NiSO_4.7H_2O$ or about 0.5% $SO_3$ |
| 2 | 2 | 21 |
| 4 | 6 | 44 |
| 6 | 9 | 65 |
| 21 | 32 | 100 |

From the foregoing tabulation it is manifest that in the presence of about 0.5% $SO_3$ based on the weight of the iron ore the conversion of iron to iron carbonyl is about 310% greater in 21 hours than in the absence of $SO_3$. It is also interesting to note that at the end of two hours the amount of iron converted to iron carbonyl in the presence of about 0.5% $SO_3$ is about 1000% of that converted in the absence of added $SO_3$. Another item of interest which is manifested by the foregoing tabulation is the fact that during the first 6 hours of the reaction the velocity of the reaction is practically linear which might justify interrupting the treatment with carbon monoxide to again treat the iron ore with soluble heavy-metal sulfate, subject the treated ore to a reduction step and then continue the treatment with carbon monoxide. However, quite satisfactory results have been obtained without second treatment with heavy-metal sulfate. Generally, it has been found satisfactory to treat the iron-containing material with soluble heavy metal sulfate once and then carry the reaction between the reduced iron and the carbon monoxide to completion.

Further illustrating the effect of treatment of iron ore with soluble heavy-metal sulfate is the comparison between the amount of conversion to iron carbonyl of untreated and treated iron ore when the reaction with carbon monoxide is carried out at temperatures of about 140° C. and pressures of about 200 atmospheres.

Iron ore was immersed in saturated aqueous nickel sulfate solution, removed from the solution, allowed to drain and dried. The ore absorbed about 2% by weight $NiSO_4.7H_2O$ equivalent to about 0.5% $SO_3$ based on the weight of the ore, the so-treated ore was then reduced by hydrogen at about 500° C. and reacted with carbon monoxide at a temperature of about 140° C. and a pressure of about 200 atmospheres. Under these conditions of temperature and pressure the conversion of iron to iron carbonyl was 100% in about 4 hours. On the other hand, untreated ore reduced by hydrogen at about 500° C. when reacted with carbon monoxide at 140° C. and 200 atmospheres pressure was only converted to the extent of about 36% into iron carbonyl at the end of about 4 hours. In other words, the treatment of the iron ore before reduction by hydrogen with soluble heavy-metal sulfate accelerated the reaction between the reduced iron ore and carbon monoxide about 300% when the reaction was carried out at 140° C. and 200 atmospheres pressure.

While similar acceleration of the velocity of the reaction between reduced iron ore and carbon monoxide can be obtained at higher pressures and higher temperatures, the practical value of this invention lies, to a large extent, in the fact that reduced temperatures and reduced pressures may be employed. Those skilled in the art will readily understand that many troublesome drawbacks of the prior art processes are avoided by employing the present process. Thus, it is manifest that the process carried out at pressures of 10 to 20 atmospheres or even at 200 atmospheres does not require apparatus of the massive proportions required when the process is carried out at pressures such as 1000 to 2000 atmospheres as is customary in prior art processes. It is also manifest that apparatus capable of withstanding temperatures of the order of 90 to 140° C. require a much lower capital investment and the list of permissive materials is much larger than of those which may be employed at considerably higher temperatures and considerably higher pressures.

Although the present invention has been described in conjunction with certain preferred embodiments, those skilled in the art will readily understand that variations and modifications thereof may be made. It is to be understood that such variations and modifications are to be considered within the purview of the specification and the scope of the appended claims. Thus, mixtures of water soluble heavy-metal sulfates may be employed.

We claim:

1. A process for producing iron carbonyl which comprises coating iron-containing material with water soluble heavy-metal sulfate, reducing said iron containing material to the metallic state and reacting said reduced iron-containing material with carbon monoxide at temperatures below 200° C. and at pressures below 200 atmospheres.

2. A process for producing iron carbonyl which comprises immersing reducible ferrous material in nickel sulfate solution to obtain reducible ferrous material having nickel sulfate distributed substantially uniformly over the surface of said reducible ferrous material, reducing said ferrous material at about 500° C. to the metallic state and subjecting said reduced ferrous material to the action of carbon monoxide at temperatures between about 90° C. and 200° C. at pressures not greater than about 200 atmospheres whereby 100% conversion of said ferrous material to iron carbonyl is obtained in not more than 24 hours.

3. A process for producing iron carbonyl which comprises intimately mixing iron ore with heavy-metal sulfate in such amounts as to provide about 0.2% to about 0.5% $SO_3$ based on the weight of the iron ore, reducing said iron ore in the presence of said heavy-metal sulfate to the metallic state and reacting said reduced iron ore with carbon monoxide whereby 100% conversion of the iron in said reduced iron ore is obtained in not more than 24 hours.

4. A process for producing iron carbonyl which comprises immersing iron ore in an aqueous solution of nickel sulfate, separating said iron ore from unabsorbed aqueous solution, reducing said iron ore in the presence of absorbed nickel sulfate to the metallic state and reacting said reduced iron ore with carbon monoxide whereby about 100% conversion of the iron in said iron ore to iron carbonyl is obtained in not more than 24 hours.

5. A process for producing iron carbonyl which comprises immersing iron ore in aqueous nickel sulfate, removing said iron ore from said aqueous nickel sulfate, separating said iron ore from unabsorbed aqueous nickel sulfate, drying said iron ore and absorbed nickel sulfate, reducing said iron ore in the presence of absorbed nickel at about 500° C. to obtain metallic iron, reacting said reduced iron ore with carbon monoxide at temperatures below 200° C. and at pressures not greater than about 200 atmospheres, whereby about 100% conversion of the iron in said reduced iron ore to iron carbonyl is obtained in not more than 24 hours.

6. A process for producing iron carbonyl which comprises immersing iron ore in aqueous nickel sulfate until said iron ore has absorbed an amount of aqueous nickel sulfate equivalent to up to about 2% by weight, separating said iron ore and absorbed nickel sulfate from said aqueous nickel sulfate, reducing said iron ore by hydrogen at about 500° C. to obtain reduced iron ore and reacting said reduced iron ore with carbon monoxide at about 90 to about 100° C. at pressures of about 10 to about 20 atmospheres.

7. A process for producing iron carbonyl which comprises immersing iron ore in aqueous nickel sulfate until said iron ore has absorbed an amount of nickel sulfate equivalent to not more than about 2% by weight of the iron ore, reducing said iron ore by hydrogen at about 500° C. to obtain reduced iron ore and reacting said reduced iron ore with carbon monoxide at a pressure of about 200 atmospheres and a temperature of about 140° C. whereby about 100% conversion of said reduced iron to iron carbonyl is obtained in about 4 hours.

8. In the process for producing iron carbonyl the improvement which comprises coating suitable ferrous material with water soluble heavy-metal sulfate prior to reduction to the metallic state.

9. In the process for producing iron carbonyl the improvement which comprises reducing iron ore by hydrogen in the presence of absorbed nickel sulfate to obtain reduced iron ore and reacting said reduced iron ore with carbon monoxide at temperatures not greater than about 200° C.

10. In the process for producing iron carbonyl the improvement which comprises reducing iron ore in the presence of heavy metal sulfate to obtain reduced iron ore and reacting said reduced iron ore with carbon monoxide at pressures not greater than about 200 atmospheres.

ALBERT E. WALLIS.
STANLEY C. TOWNSHEND.